H. DECH.
VEHICLE TIRE.
APPLICATION FILED MAY 27, 1913.
1,165,576.
Patented Dec. 28, 1915.
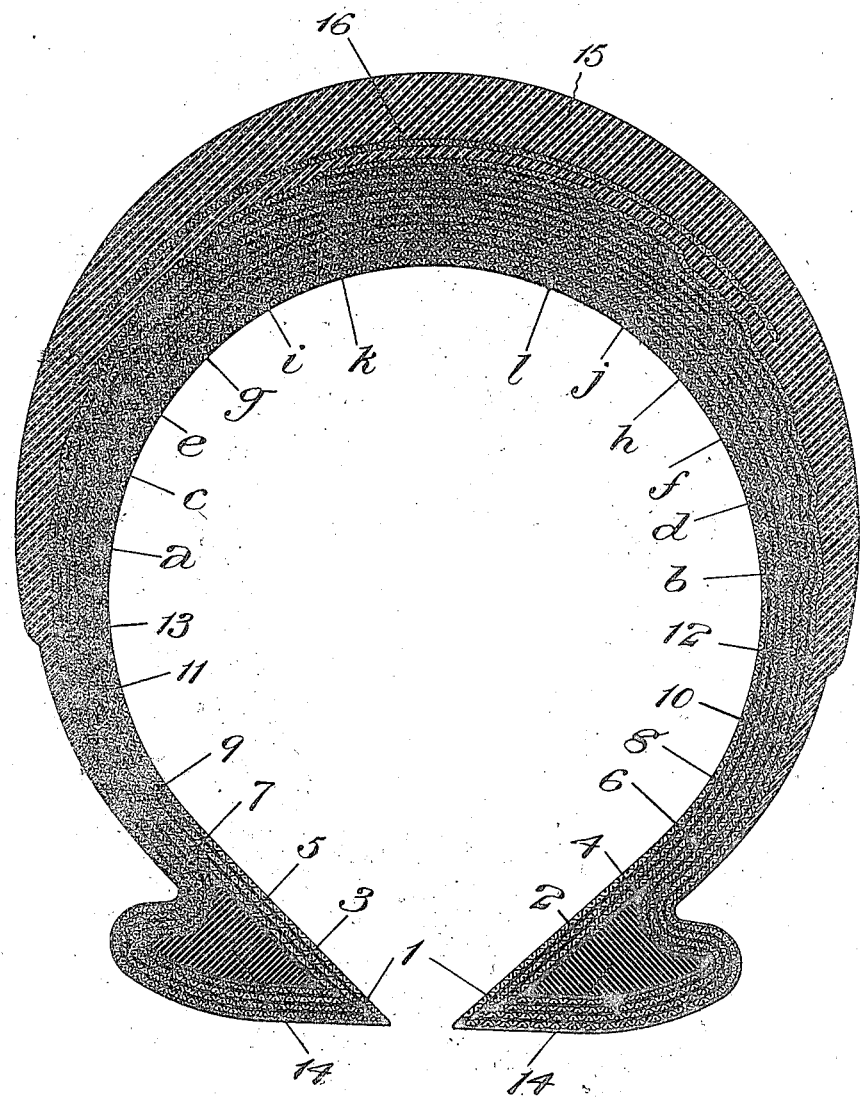
Witnesses:
Harry J. Fleischer
F. George Barry
Inventor
Henry Dech
by his attorneys
Brown & Stuart

UNITED STATES PATENT OFFICE.

HENRY DECH, OF TRENTON, NEW JERSEY, ASSIGNOR TO EUREKA TIRE COMPANY, OF TRENTON, NEW JERSEY, A CORPORATION OF NEW JERSEY.

VEHICLE-TIRE.

1,165,576.  Specification of Letters Patent.  Patented Dec. 28, 1915.

Application filed May 27, 1913. Serial No. 770,191.

*To all whom it may concern:*

Be it known that I, HENRY DECH, a citizen of the United States, and resident of Trenton, in the county of Mercer and State of New Jersey, have invented a new and useful Improvement in Vehicle-Tires, of which the following is a specification.

This invention relates to vehicle tires, and more particularly to pneumatic tires. In its most definite form, it pertains to open bellied casings for pneumatic tires.

The object is to provide an article of this character which will have great strength, wear-resisting and puncture proof qualities combined with a maximum of resiliency.

Another object is to eliminate to a great extent, the so-called internal friction in the tire when in use on a vehicle, thereby providing means for economizing the motive power used in propelling the vehicle.

The so-called casings for pneumatic vehicle tires are generally, if not universally, constructed on the open bellied principle, that is, they are substantially horseshoe shape in cross section; and consist in general of a carcass composed of a plurality of layers of fabric, and protected by an outer covering of rubber compound. The carcass is generally constructed by stretching strips of bias fabric, impregnated with unvulcanized rubber, about a metallic annulus or core and forming the edges of the strips of fabric down about the sides thereof. Owing to the considerable difference between the inner diameter and the outer diameter of the core or former, it is necessary to stretch the central portion of the strips of fabric, which lie upon the outer periphery of the core, practically to their elastic limit in order that it may be possible to form the edges of the strips of fabric smoothly down upon the sides of the core. The entire operation of making and vulcanizing these casings is familiar in the art and will not be here described, reference being made merely to the single step referred to in order to clearly point out one of the great advantages of my invention. This great tension which is upon the center of the layers of fabric results in a structure which has been stretched, at its outer periphery, to its reasonable elastic limit, so far as any further peripheral extension is concerned. Consequently, the undulations to which the tread or outer portion of the tire is subjected during its use on a vehicle in motion, generate a tremendous amount of internal friction in this part of the tire, which tends to greatly lessen the life of the tire by weakening the homogeneity of the structure, and also consumes an astonishing amount of the motive power provided for propelling the vehicle. It is a scientifically established fact that one of the greatest sources of loss of power between the engine and the road in a well designed motor vehicle is this internal friction in the tires.

In constructing the tire casing of the general kind mentioned, sufficient layers of fabric are used to give the tire considerable strength and wear-resisting qualities, but it has been found impracticable to incorporate a sufficient number of these plies or layers of fabric in a tire to give it a practically puncture-proof structure and extraordinary wearing properties, owing to the fact that such increase in the fabric renders the tire extremely stiff in its side walls, thus materially reducing its resiliency, and also tends to increase the amount of internal friction.

With the above thoughts in mind, I have devised a tire structure in which the layers of fabric are so disposed as to remove the necessity for great stretching at the outer periphery of the tire carcass; and in which the outer portion of the tire carcass contains a relatively great number of layers of fabric, without any increase in the number of plies of fabric employed in the side walls of the tire; thus obviating the defects and obtaining the advantages above detailed.

A practical embodiment of the invention is represented in the accompanying drawing which shows an enlarged cross section of a completed clencher casing.

In making this tire casing, I preferably apply the first strip or layer of fabric, denoted by 1, about an appropriate core or mandrel in the usual manner, the layer 1 extending completely about the mandrel from side to side, so that it will reach from margin to margin in the completed tire. This layer 1 may be stretched on in the usual manner above set forth. In applying the next layer or ply, 2, I take a strip somewhat narrower than has heretofore been used, and superpose it upon the layer 1, with one edge of the layer 2 adjacent to one edge of the layer 1, (indicated on the right hand side in the drawing), but with the other edge of the layer 2 extending only about half way down the opposite side of the layer 1; this point of termination of the layer 2 being denoted in the drawing by the letter *a*. After the layer 2 has been applied, a layer 3, of substantially the same width as the layer 2, is superposed on the layers 1 and 2; one edge of the layer 3 being substantially even with the edge of the layer 1 at the margin of the tire to which the layer 2 did not extend; (this edge being indicated at the left in the drawing). The other edge of the layer 3 extends down the opposite side, upon the layers 1 and 2, to a point substantially opposed to the terminus of the layer 2, which point of termination of the layer 3 is indicated by *b*. After the third layer of fabric has been applied, the succeeding layers are put on in the manner already described, successive layers extending transversely from first one margin and then the other of the tire carcass, to a point on the opposite side of the tire above the margin. For instance, the fourth layer, denoted by 4, starts at the margin to the right of the drawing and terminates its transverse extension at a point denoted by *c* on the other side of the tire, a predetermined distance from the point *a*. The next layer, denoted by 5, starts at the margin shown at the left of the drawing and terminates at the point denoted by *d*, the same distance above the point denoted by *b*, as the point *c* is above the point *a*. Similarly, the following layer, indicated by 6, starts at the right hand margin and terminates at the point denoted by *e*; the layer denoted by 7 starts at the left hand margin and terminates at the point *f*; the layer denoted by 8, starts at the right hand margin and terminates at the point *g*; the layer denoted by 9, starts at the left hand margin and terminates at *h*; the layer denoted by 10, starts at the right hand margin and terminates at the point *i*; the layer denoted by 11, starts at the left hand margin and terminates at the point *j*; the layer denoted by 12, starts at the right hand margin and terminates at the point *k*; and the last layer of the carcass proper, denoted by 13, starts at the left hand margin and terminates at the point *l*.

It will be observed that after the first four layers have been applied, the ordinary bead cores 14 may be inserted for initiating the customary clencher shape for the margins of the casing, and that all the layers subsequent to the fourth layer extend over the said beads 14, meeting with the layers 1 to 4 inclusive at the inner apex of the bead or margin. It will be further observed that after the first layer has been applied, the layers of each succeeding couple of plies of fabric are substantially the same width, and their lower edges are at the opposite margins or beads of the casing, while their upper edges, after overlapping at the outer part of the tire, terminate at points substantially opposite each other in the sides of the casing. It is to be understood that these layers are of suitable fabric cut on the bias and properly impregnated or coated with a vulcanizable rubber compound, and that the tire may be completed by the addition of a tread rubber compound 15, with, if desired, the customary breaker strip 16, after which the whole tire may be vulcanized by any desired method, preferably the so-called one-cure wrapped-tread process.

Owing to the fact that the layers of fabric, numbers 2 to 13 inclusive, do not extend transversely around the tire section from margin to margin, it is not necessary to put a great strain upon the fabric in order to have the layers lie smooth, for the reason that it is very much easier to stretch the edge or edges of the layers which terminate in the side walls of the tire but do not extend to the margins thereof, than it would be to stretch the central portion of the plies or layers of fabric if both edges of the strips extended to the margins of the tire. Accordingly, the fabric which constitutes the outer portion of the tire, with the exception of layer 1, is under very much less tension than is the case with the ordinary structure of tire casing, and therefore the wave motion which continually passes through the periphery of the tire when the vehicle is in motion, is readily absorbed by the tire without the generation of undue internal friction. Furthermore, while the side walls of the tire, for a distance above the clencher beads or margins, are merely the regular thickness of a so-called "seven ply" casing, and thereby retain the appropriate degree of resiliency; the outer portion of the casing includes six more layers of fabric, exclusive of the breaker strip 16, thereby rendering the casing very nearly puncture proof. Again, the graduating in the thickness of the fabric carcass from the margins outward toward the tread, causes a uniform increase in stiffness and strength toward the tread portion, hence obviating the presence of any fixed point at which the great resiliency ceases and the great stiffness begins.

I do not intend to limit this invention to any particular kind of tire or to any particular kind of fabric, or to any particular number of layers or plies of fabric, or to any particular extent or width of the strips of fabric, or to any other features hereinabove detailed, except as they are specified in the claims; as I am aware that various changes may be resorted to in the form, structure and arrangement of the several components of the tire without departing from the spirit and scope of my invention.

What I claim is:

1. A tire having a carcass composed of peripherally disposed sheets of fabric, each sheet extending completely around the circumference of the tire, and a said sheet having a transverse extent from one margin of the tire to a terminating point in the opposite side wall above the margin.

2. A tire having a carcass composed of peripherally disposed sheets of fabric, each sheet extending completely around the circumference of the tire, and a plurality of adjacent sheets having a transverse extent from opposite margins of the tire to terminating points in opposite side walls above the margins whereby said adjacent sheets will overlap each other in the tread portion of the tire.

3. A tire having a carcass composed of peripherally disposed sheets of fabric, some of said sheets being arranged in pairs, the sheets of each pair being juxtaposed and having a transverse extent from opposite margins of the tire to terminating points in opposite side walls above the margins whereby said sheets overlap in the tread portion of the tire, and said pairs of sheets being graduated in width so that the sheets in each succeeding outer pair have less transverse extent than the sheets in the preceding pair.

4. A tire having a carcass composed of peripherally disposed sheets of fabric, a said sheet having a transverse extent from margin to margin of the tire and forming a foundation for the carcass, and the remaining sheets being arranged in pairs, the sheets of each pair having a transverse extent from opposite margins of the tire to terminating points in opposite side walls above the margins, whereby the sheets overlap in the tread portion of the tire, and the sheets of each succeeding outer pair having less transverse extent than the sheets of the preceding pair.

5. A tire having a carcass composed of peripherally disposed sheets of fabric, a said sheet having a transverse extent from margin to margin of the tire and forming a foundation for the carcass, and the remaining sheets being arranged in pairs, the sheets of each pair having a transverse extent from opposite margins of the tire to terminating points in opposite side walls above the margins whereby the sheets overlap in the tread portion of the tire, and the sheets of each succeeding outer pair having less transverse extent than the sheets of the preceding pair, all of said sheets being juxtaposed and firmly bonded into a coherent, unitary structure.

6. A tire having a carcass composed of peripherally disposed sheets of fabric, every sheet having its circumferential central portion lying in a radial plane with respect to the cross section of the tire at an angle to the corresponding plane in which the corresponding portion of every other sheet lies.

7. A tire casing comprising a body made from resilient material, having clencher flanges at the edges thereof, and a reinforcing medium embedded within the body at the innermost side thereof and including two distinct series of fabric plies, both series being arranged in overlapping relation to each other throughout the tread area of the body and one edge of each ply terminating at one side of said body spaced from the clencher flanges, while the opposite edge is extended through the opposite side of the body into and terminates within the clencher flange thereon whereby these plies have stretches thereof extended over the tread portion of the body and the sides thereof with one longitudinal edge of each ply of each series lying within the clencher flanges and the remaining edges of the said plies of both series terminating spaced from the clencher flanges on the body.

In testimony, that I claim the foregoing as my invention, I have signed my name in presence of two witnesses, this nineteenth day of May, 1913.

HENRY DECH.

Witnesses:
W. W. MYERS,
OMER E. LILLY.